April 9, 1963  R. C. WEBSTER ET AL  3,084,599
ROCKET LAUNCHERS

Filed Feb. 1, 1961  4 Sheets-Sheet 1

INVENTORS
Roland C. Webster &
George F. Kirchoff, Jr.
BY Martha L. Ross
AGENT

April 9, 1963  R. C. WEBSTER ET AL  3,084,599
ROCKET LAUNCHERS
Filed Feb. 1, 1961  4 Sheets-Sheet 2

INVENTORS
Roland C. Webster &
George F. Kirchoff, Jr.
BY
Martha L. Ross
AGENT

April 9, 1963 R. C. WEBSTER ET AL 3,084,599
ROCKET LAUNCHERS
Filed Feb. 1, 1961 4 Sheets-Sheet 3

INVENTOR
Roland C. Webster &
George F. Kirchoff, Jr.
BY Martha L. Ross
AGENT

United States Patent Office 3,084,599
Patented Apr. 9, 1963

3,084,599
ROCKET LAUNCHERS
Roland C. Webster and George F. Kirchoff, Jr., Annandale, Va., assignors to Atlantic Research Corporation, a corporation of Virginia
Filed Feb. 1, 1961, Ser. No. 86,352
7 Claims. (Cl. 89—1.7)

The present invention relates in general to rocket launchers, and more particularly to rocket launchers which include means for increasing the launching velocity of the rocket by providing an augmenting launching thrust in addition to the reaction thrust produced by the rocket motor.

Heretofore, the more common types of rocket launchers have been of the open breech variety which were of such construction that the exhaust gases produced by the rocket motor after ignition pass freely to the surrounding atmosphere. If it is desired to provide additional launching thrust for increasing the launching velocity and range of the rocket, the use of booster rockets has been usually resorted to.

Additionally, the use of closed breech rocket launchers has been proposed, particularly for use under conditions which prevent use of an open breech launcher, as in tank turrets and like installations. Such launchers usually involve a uniform diameter launcher tube wherein a rocket is initially positioned with its trailing end immediately adjacent the closed breech of the launcher tube. While the use of such closed breech launchers will inherently result in some entrapment of exhaust gases in the breech zone of the launcher tube which will provide a rapidly increasing pressure in this zone acting to expel the rocket from the launcher tube if the rocket walls lie closely adjacent the walls of the launcher tube, it has been recognized that such an arrangement is attended by decided disadvantages. For example, the exhaust gases trapped in the tube have been found to produce disturbing effects when the rocket leaves the muzzle of the launcher tube and the acceleration forces produced by the pressure rise of the trapped exhaust gases occur in impulses resulting in uneven acceleration. It has been found, for example, that there is a very short duration initial pressure rise and acceleration force immediately upon ignition of the rocket motor until the rocket is set into rapid motion up the launcher tube, and that this rapid initial motion of the rocket produces a rapid increase in the volume behind it resulting in a sharp reduction in pressure and acceleration force. For many applications, also the initial acceleration produced by the combustion gas entrapped in this small breech volume is excessive.

A rocket launcher system designed to impart a high launch velocity to a rocket by employing the exhaust gases entrapped in a large volume chamber communicating with the breech end of the launcher tube to provide additional launching thrust and maintain substantially even acceleration is disclosed in the prior application S.N. 855,845, filed November 27, 1959, having common assignee. While the launcher there disclosed produced a significant increase in launch velocity, it has been found that further increase in launch velocity is often desirable. For example, surface wind velocities at the launching site may exert undesirable influences on the launching, requiring substantially higher launch velocities to preserve system performance and reliability. While launchers of the type disclosed in this prior patent application makes possible routine launchings in surface winds of up to 15 miles per hour, additional increases in launch velocity may be necessary to effect reliable launchings at substantially high surface wind velocities.

An object of the present invention therefore is the provision of a novel rocket launcher tube having means for entrapping gases to exert pressure on a piston intercoupled with the rocket to impart a high launch velocity to the rocket in a manner maintaining substantially constant acceleration of the rocket as it proceeds through the launcher tube.

Another object of the present invention is the provision of a rocket launcher of the closed breech type having means for using the rocket exhaust gases and gases produced by an auxiliary gas generator to increase launching velocity and drive the rocket out of its launching tube with impulse-free acceleration.

Another object of the present invention is the provision of a rocket launcher having a relatively large volume chamber as compared to the volume of the launcher tube in communication with the breech zone of the launcher tube entrapping rocket exhaust gases produced upon ignition of the rocket, an auxiliary gas generator actuated subsequent to ignition of the rocket to augment the exhaust gases, and a piston associated with the trailing end of the rocket to separate therefrom when the rocket leaves the launcher, coacting to provide additional launching thrust from gas pressure and arranged in such a manner as to temper initial acceleration on the rocket to maintain substantially even acceleration as the rocket proceeds through the launcher tube.

Another object of the present invention is the provision in a rocket launcher having a launcher tube and a relatively large volume chamber in communication with the breech end thereof for entrapping exhaust gases and exerting a launching pressure against a rocket expelling piston, of gas generator means actuated in response to exhaust gas pressure for introducing additional gases into the chamber to augment the exhaust gases and impart substantially higher launching velocity to the rocket.

Other objects, advantages and capabilities of the present invention will become apparent from the following detailed description, taken in conjunction with the accompanying drawings, illustrating one preferred embodiment of the invention.

Figure 1:
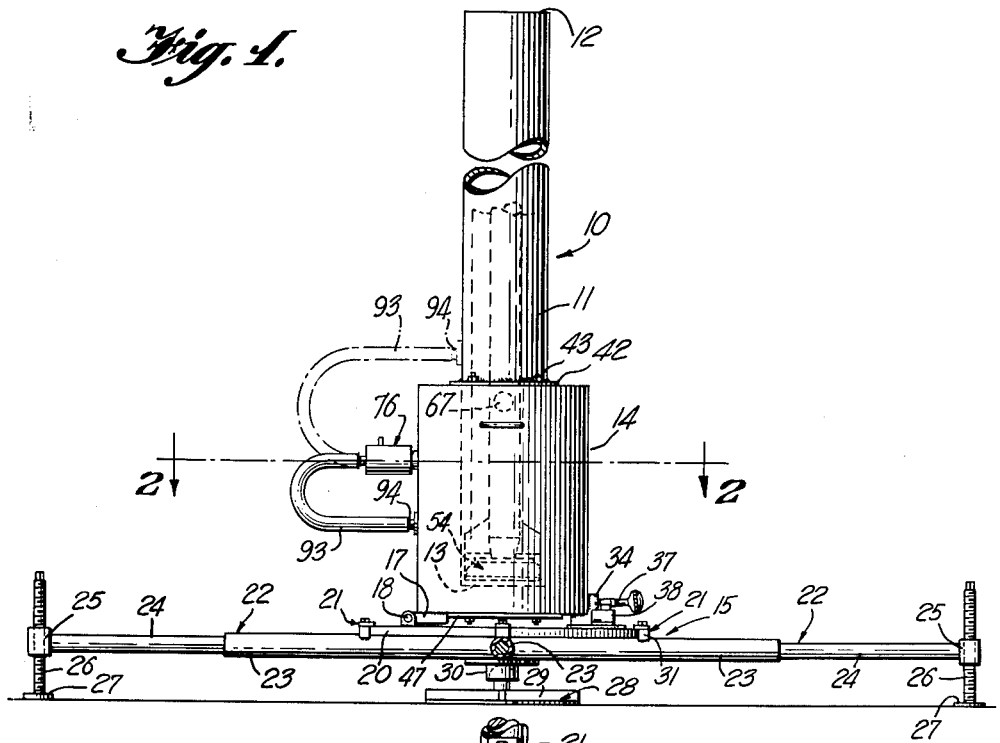
FIGURE 1 is a side elevation of a rocket launcher embodying the present invention.
Figure 2:
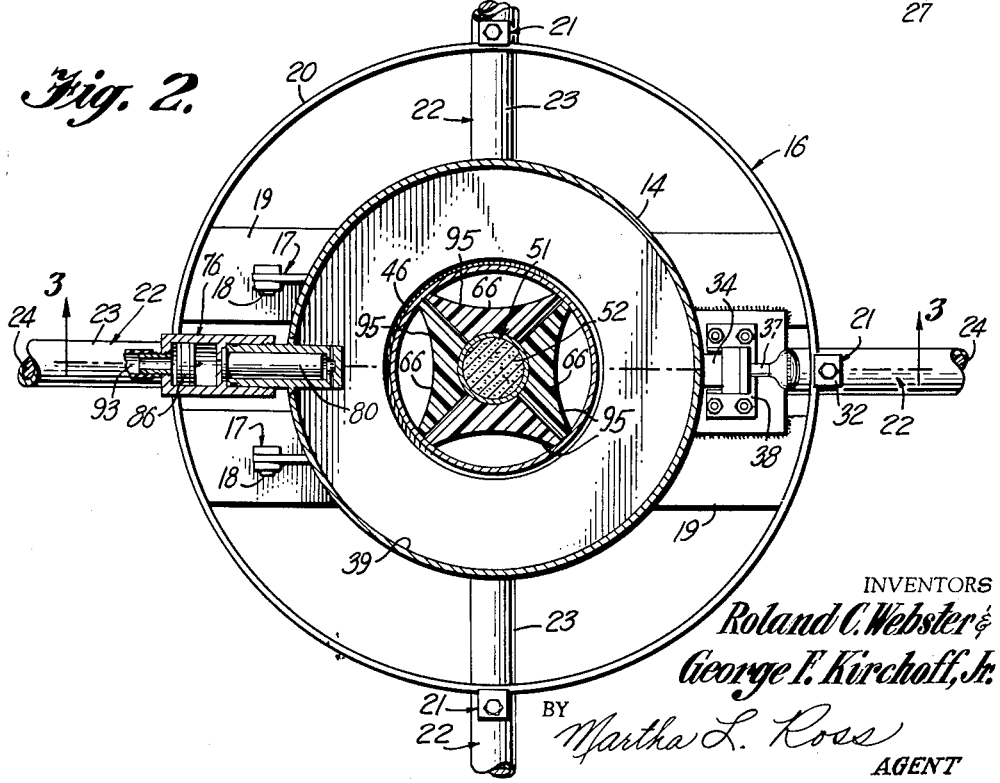
FIGURE 2 is a horizontal, transverse section view of the rocket launcher, taken along the line 2—2 of FIGURE 1.
Figure 3:
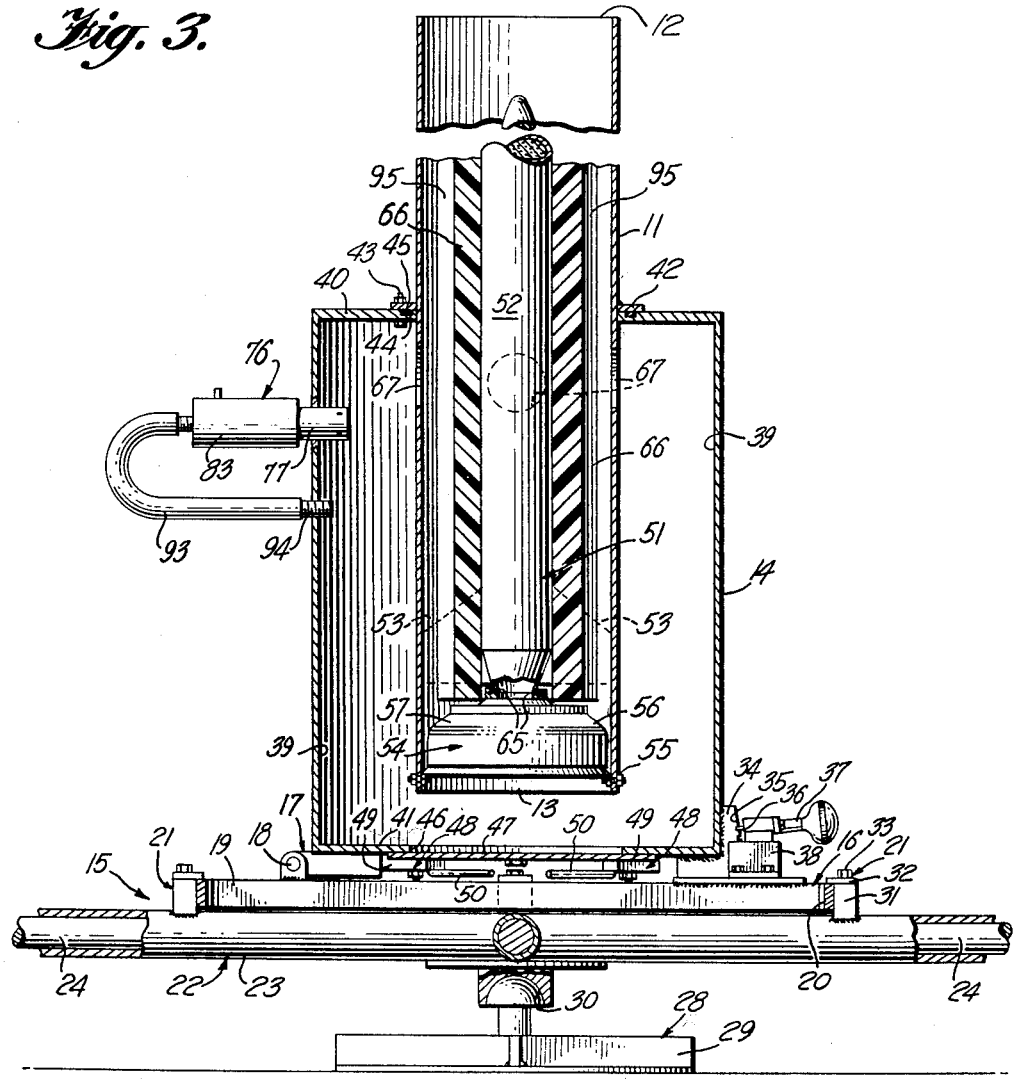
FIGURE 3 is a vertical section view of the rocket launcher, taken along the line 3—3 of FIGURE 2.
Figure 6:
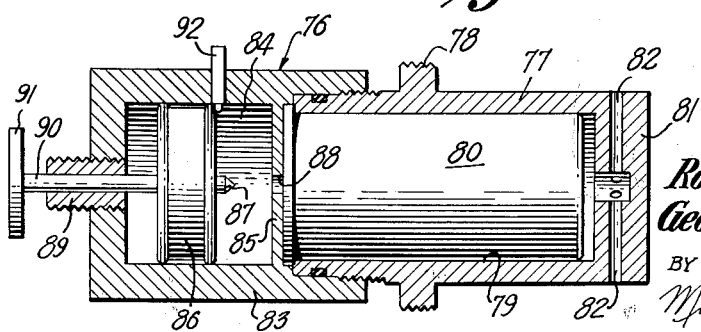
FIGURE 6 is a vertical longitudinal section view of a gas generator constructed in accordance with the present invention for augmenting the exhaust gases in the free volume chamber.
Figure 5:
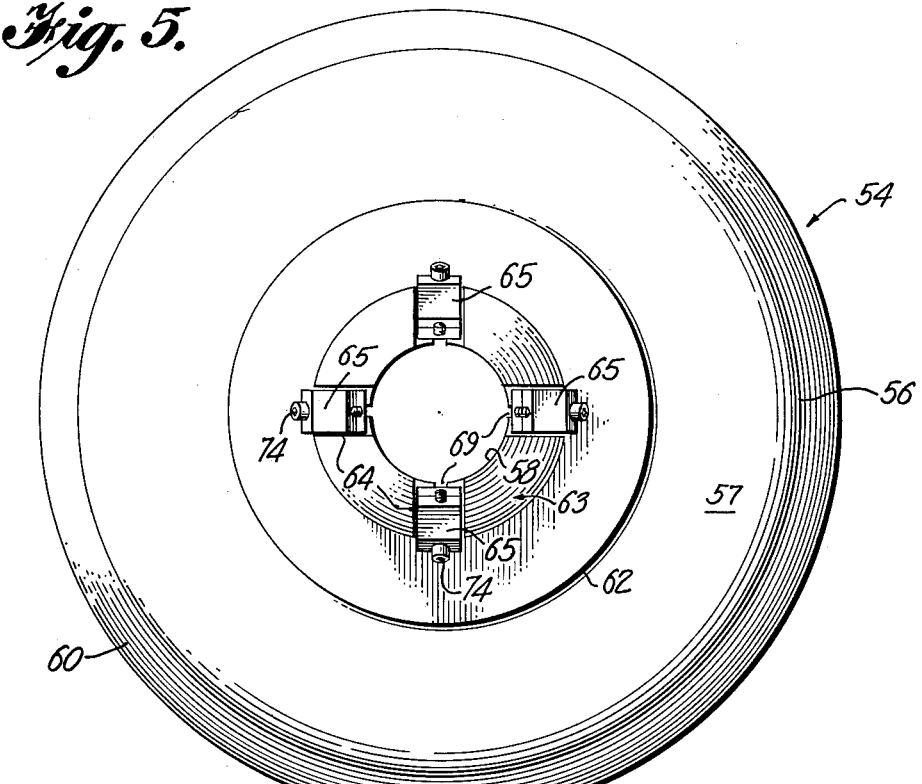
FIGURE 5 is a top plan view of the separable piston.

Referring to the drawings wherein like reference characters designate corresponding parts throughout the several figures and particularly to FIGURES 1–3, the rocket launcher of the present invention, designated generally by the reference character 10, comprises an elongated launcher tube 11 of true circular cross-section having a muzzle end 12 and a breech end 13, a pressure modulating chamber 14 surrounding the breech end portion of the launcher tube 12 extending in concentric relationship about the launcher tube, the launcher tube and chamber assembly being mounted for adjustment in azimuth and elevation on a launcher support assembly indicated by the reference character 15.

The launcher support assembly 15 is arranged to permit tilting of the launcher tube and pressure modulating chamber assembly to a horizontal position for breech-type loading and to provide elevation adjustment of as much as 10° from vertical and to permit training of the launcher by turning in azimuth. To this end, the base end of the pressure modulating chamber 14 is hinged to an azimuth and elevation table assembly 16 by means of a hinge assembly 17 having a pivot pin 18 to permit the launcher tube 11 and chamber 14 to be tilted about the axis of the pivot pin 18. The azimuth and elevation table assembly may assume the form illustrated in the drawings wherein a bridging panel 19 extends diametrically across an annular azimuth ring 20 which is supported for rotation about its center by azimuth lock units 21 mounted on each of four horizontal supporting legs 22 forming a cross-shaped support. The support legs 22 are preferably formed of an inner inner stationary tubular sleeve 23 and an extension arm 24 telescopically supported in the sleeve 23 to permit extension of the supporting legs to the desired length, the outer end of each extension arm having a threaded member 25 thereon to receive a threaded adjustment screw 26 having a bearing plate 27 at the lower end thereof, or a threaded stake which may be driven into the ground and rotated to effect leveling of the launcher support assembly 15. A pivot stand 28 is also carried by and depends from the center of the launcher support assembly and includes an enlarged bearing plate 29 and a pivot joint 30 such as a socket and head having a segmental surface of spherical curvature to permit tilting of the bearing plate 29 relative to the plane of the support legs 22.

The azimuth lock units 21 each comprise a guide block 31 welded to each of the support legs 22 at a proper distance from the junction of the four legs 22 so that the inner surfaces of each of the guide blocks 31 slidably abut the outer surface of the azimuth ring 20 and maintain the ring centered with respect to the juncture of the support legs 22, and a clamping plate 32 surmounting each of the guide blocks 31 and extending inwardly of the inner guide surface of the associated guide block 31 to bear against the top edge of the azimuth ring 20. A bolt 33 threaded into each of the guide blocks 31 and extending through the associated clamping plate 32 permits adjustment of the clamping plate 32 to frictionally lock the azimuth ring against rotation.

Welded or otherwise affixed to the lower corner of the pressure modulating chamber 14 at a point diametrically opposite the hinge assembly 17 is an elevation sector 34 having a toothed arcuate periphery 35 which is engaged by a lug 36 on the inner end of an axially reciprocal elevation lock member 37 supported in a bracket 38 mounted on the bridging panel 19 of the azimuth and elevation table 16. These components form an elevation index assembly, with the elevation lock member 37 resiliently biased or otherwise urged toward the elevation sector 34 to normally retain the lug 36 between a selected pair of the teeth on the toothed periphery 35 of the sector 34 and lock the launcher tube at the adjusted elevation setting.

The pressure modulating chamber 14 is generally in the form of a heavy walled closed cylindrical container having a continuous cylindrical outer wall 39 and annular top and bottom wall portions 40 and 41. The top of the annular top wall 40 of the pressure modulating chamber 14 forms the support for the launcher tube 11 and has a central aperture through which the launcher tube 11 projects. The launcher tube is provided with a rigid annular mounting flange 42 which is adapted to lap over the portions of the annular top wall 40 immediately bounding the central opening therein and be secured to the top wall 40 by bolt and nut units 43. The mounting flange 42 is suitably located lengthwise of the launcher tube 11 so as to dispose the breech end 13 of the launcher tube 11 a selected distance above the plane of the annular bottom wall 41 of the chamber 14. In order to provide an effective seal at the juncture of the mounting flange 42 and top wall 40, the top wall 40 may be provided with an annular groove 44 spaced slightly outwardly from the central opening in the top wall 40 and concentric with the axis of the top wall, in which is bonded an annular gasket 45 of neoprene or light flexible material to underlie and butt against the mounting flange 42.

The opening 46 in the bottom wall 41 of the chamber 14, which opening is preferably larger in diameter than the launcher tube 11, is normally closed by a circular cover plate 47 releasably held in place by conventional breech dogs 48 mounted on the lower surface of the annular bottom wall 41, the breech dogs 48 being of conventional construction including, for example, a pivoted clamping block 49 and operating handle 50.

Figure 4:
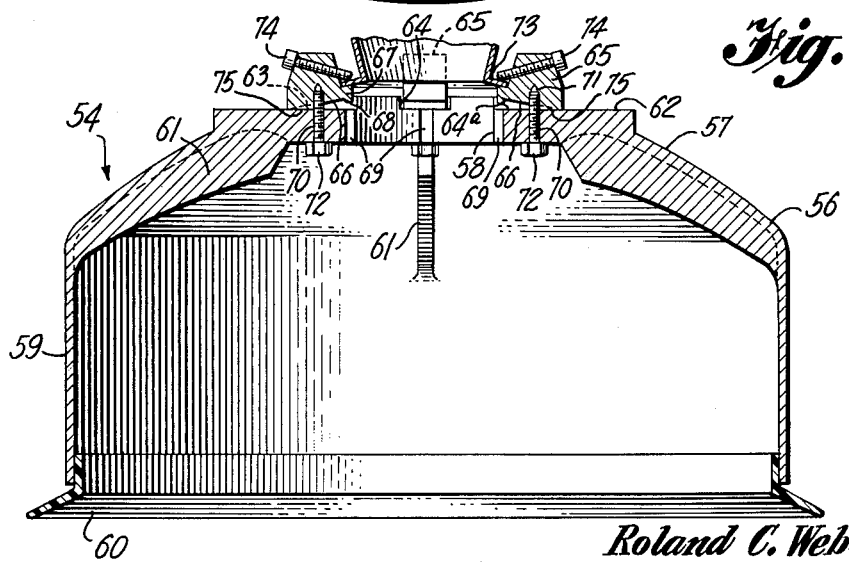
FIGURE 4 is a vertical, transverse section view to enlarged scale of one preferred form of the separable piston employed in the rocket launcher.

The rocket, herein generally indicated by the reference character 51, which is of the conventional type having an elongated body 52 and guidance fins 53, is adapted to be loaded into the launcher tube 11 from the breech end 13 thereof. A separable piston assembly, indicated generally by the reference character 54, is removably secured to the trailing end portion of the rocket and supports the rocket within the launcher tube, the piston assembly 54 being in turn supported by retractable piston supports 55 supported in the wall of the launcher tube 11 adjacent the breech end 13. The retractable piston supports 55 may be in the form of pins or threaded screws which may be shifted outwardly along radial axes of the launcher tube 11 to retract them from the bore of the launcher tube and permit passage of the piston assembly 54 through the breech end 13. The piston supports 55 are then adjusted to project their inner ends beneath the piston assembly 54 and form supports therefor. The piston assembly 54 should be of such a construction that the piston will readily separate from the rocket the instant the rocket leaves the launcher tube so as not to interfere with the action of the rocket fins 53. One satisfactory form of piston assembly is illustrated in the drawings, wherein the piston assembly comprises an integral cast piston body 56 of generally cup-shapted configuration opening toward the breech end of the launcher tube including a generally transverse wall portion 57 having a central aperture 58 therein and a rearwardly or downwardly extending annular flange 59, to the trailing end of which an annular sealing gasket 60 of suitable flexible material is bonded. In the specific embodiment herein illustrated, the piston is provided with a plurality of internal reinforced ribs 61 and a forwardly or upwardly projecting boss 62 forming a platform-like extension having an interrupted annular inclined ramp formation 63 surrounding the central aperture 58 in the transverse wall portion 57. The inclined ramp formation 63 is interrupted at points spaced about 90° apart, in the exemplary embodiment, by wells 64 having parallel side walls between which are received rocker arm type releasable mounting blocks 65. The mounting blocks 65 normally occupy the position illustrated in FIGURE 4, wherein the bottom wall portion 66 adjacent the inwardly projecting foot 67 is inclined upwardly from the bottom 64a of the associated well and the downwardly projecting nose 68 on the foot portion 67 is spaced upwardly from the accommodating opening 69 in the piston. The mounting blocks 65 are restrained in this position by brittle pins 70 having threaded upper and lower ends, the threaded upper end being received in an inwardly threaded socket 71 in the associated mounting block 65 and the threaded lower end having a nut 72 thereon. An outwardly projecting lip or flange 73 on the trailing end of the rocket body 52 is adapted to be seated against the upwardly facing surface of the foot portion 67 of each mounting block 65 and initially restrained in intercoupled or interlocked relation with the mounting blocks by a threaded screw 74 threaded through each of the mounting blocks. The mounting blocks 65 are also provided with a bottom wall portion 75 in the outer zone thereof which is inclined relative to the inner bottom portion 66 and rests flat against the bottom 64a of the well 64 in the normal position of the mounting block 65. The breaking strength of the brittle pins 70 is so selected that the piston will be released from the rocket by breaking of the brittle pins as soon as the thrust against the piston becomes sufficiently greater than the thrust of the rocket to cause the mounting blocks 65 to tip inwardly and downwardly.

An auxiliary gas generator unit, designated generally by the reference character 76, is mounted in the side wall 39 of the expansion chamber 14. This gas generator unit in one preferred embodiment, comprises a hollow cylindrical body 77 having an externally threaded enlarged diameter portion 78 adapted to be coupled into an accommodating internally threaded opening in the side wall 39 of the expansion chamber and an internal bore 79 for housing a gas generator cartridge 80. The inner end of the tubular holder 77 is provided with a closure wall 81 having a plurality of radially extending vents 82 communicating with the bore 79 and opening into the interior of the expansion chamber 14. An outer closure 83 is threaded onto the tubular holder 77 and contains a cylinder 84 separated from the cartridge housing bore 79 by a transverse partition 85 and housing axially reciprocative piston 86. The piston 86 has a firing pin 87 on the face thereof adjacent the cartridge housing bore 79 to be projected through a suitable aperture 88 in the partition 85 and strike the percussion cap or other suitable firing device in the gas generator cartridge 80 when the piston reaches its inner limit position.

An externally threaded hose coupling sleeve 89 is fitted into a suitable threaded central aperture in the rear wall of the outer closure 83, through which the stem 90 of a piston withdrawing handle 91 may be projected. The inner end of the stem 90 is threaded and is adapted to be received in a complementary threaded socket in the outer portion of the piston 86, whereby the stem 90 of the handle 91 can be inserted through the bore in the coupling sleeve 89 and threaded into the socket therefor in the piston 86 to effect withdrawal or retraction of the piston 86 to a position wherein its inner wall lies rearwardly of a spring-pressed plunger 92 projecting into the cylinder 84 to resiliently restrain the piston 86 against inward movement from the retracted position. Following removal of the stem 90 from the bore of the coupling sleeve 89, one end of an air hose 93 is coupled to the coupling sleeve 89 and the other end of the air hose is placed in communication with either the interior of the pressure modulating chamber 14 or of the launcher tube 11. In one preferred embodiment, as illustrated in solid lines in FIGURE 3 of the drawings, the hose 93, which is a high-pressure, high-temperature hose of conventional construction, is placed in communication with the interior of the pressure modulating chamber 14 by a suitable fitting in the wall 39 thereof, and the adjustment of the spring plunger 92 is such that the piston 86 is retained in its retracted position until the pressure on the outer face of the piston reaches a sufficient value to overcome the spring tension. The piston 86 then moves forward to contact the percussion cap of the gas generator cartridge 80 and set off the charge. This pneumatic activating feature assures that the rocket is properly ignited in the launcher before the gas generator is activated, and eliminates the problems inherent in a second electrical ignition system.

In another preferred form, the end of tthe air hose 93 remote from the gas generator may be placed in communication with the interior of the launcher tube 11, as illustrated in broken lines in FIGURE 1 of the drawings, at a suitable position along the launcher tube so that the piston 86 will not be subjected to the pressures developed in the pressure modulating chamber 14 until the piston 56 passes the position of the sensory end 94 of the hose 93. By this arrangement, actuation of the auxiliary gas generating unit may be limited to a point past the pressure peak which would be produced by the pressure modulating chamber without an auxiliary gas generator, thereby minimizing peak acceleration and resonance without sacrifice in increased exit velocity.

Since the guidance fins 53 project radially beyond the rocket body 52 in conventional rocket configurations, packing sections 95 are provided which fit between the fins of the rocket and extend a substantial distance along the rocket body. The packing sections 95 are configurated to abut the sides of the rocket body 52 and engage the inner surface of the launcher tube 11 at sufficient points to prevent the rocket from wobbling in the launcher tube prior to firing. One preferred embodiment is illustrated in the drawings wherein each of the packing sections 95 engage the inner surface of the launcher tube 11 at two circumferentially spaced points. The packing sections are preferably made of a light weight, heat insulating material, for example foamed plastics such as "Styrofoam" or foamed polyurethane, to minimize dead load.

In order to accomplish the objects of this invention, the (pressure modulating chamber 14 should provide a large initial volume into which the gases can expand. The pressure modulating chamber generally should have a volume equal to at least about 5 and preferably 10 times the volume increase produced by movement of the rocket one foot up the launcher tube. The function of the pressure modulating chamber 14 to accomplish the functions of tempering initial acceleration on the rocket, maintaining substantially constant acceleration on the rocket as it proceeds through the launching tube, and increasing initial velocity of the rocket, will be more clearly understood from consideration of the mathematical relationships describing pressurization of the launcher. The pressurization of the launcher can be described by the general gas law:

$$\frac{P(V_I + \Delta V)}{T} = K$$

where:

K is a constant
P is the pressure (which is proportional to acceleration)
$V_I$ is the initial volume behind the rocket in which the rocket exhaust gases are accumulated
$\Delta V$ is the volume increase due to the rocket traveling up the launcher tube
T is the temperature Since the temperature remains relatively constant, this relationship can be stated, for all practical purposes, to be $P(V_I + \Delta V) = K$.

From this relationship, it will be apparent that on ignition, the pressure (and the acceleration) will vary inversely with the initial volume $V_I$. Thus if the initial volume is very small, the pressure will be very high and there will be very high initial acceleration of the rocket. As the initial volume $V_I$ provided by the launcher becomes larger, the initial pressure and acceleration becomes smaller, since the product of these two factors must equal a constant.

To maintain maximum and relatively impulse free acceleration, it is necessary that the increase in volume, $\Delta V$, as the rocket travels up the launcher tube, be small relative to the initial volume $V_I$. The small $\Delta V$ factor relative to the large initial volume factor $V_I$, minimizes change in the pressure factor P and, thereby, acceleration. By providing a large initial volume behind the rocket in which the rocket's exhaust gases are accumulated, for example, in the form of the large volume pressure-modulating chamber 14 in communication with the breech of the launching tube 11, the desired conditions can be achieved.

To load the launcher, the operator withdraws the elevation lock member 37 to release the lug 36 from the teeth of the elevation sector 34 and swings the launcher tube 11 and pressure modulating chamber 14 about the pivot pin 18 of the hinge assembly 17 to decline the axis of the launcher tube 11 to a substantially horizontal position. The breech dogs 48 are then actuated to release the cover plate 47 and the cover plate 47 is withdrawn from the breech opening 46, thereby exposing the rear end of the chamber 14 and launcher tube 11 for insertion of the rocket therein. The piston assembly 54 is then assembled onto the trailing end of the rocket by seating the outwardly flaring lip 73 at the exit end of the nozzle on the feet 67 of the mounting blocks 65 and adjusting the screws 74 to couple these elements together. The packing sections 66 are then fitted about the fins and adjacent body portions of the rocket and the assembled rocket, packing sections and piston assembly are then inserted through the breech opening 46 and breech end 13 of the launcher tube 11 while the retractable piston supports 55 are retracted from the bore of the launcher tube. The piston supports 55 are then projected into the bore of the launcher tube to form rests for the trailing edges of the peripheral flange 59 of the piston assembly 54. The cover plate 47 is then supported over the breech opening 46 and the breech dogs 48 shifted to cover plate locking position, and the launcher tube 11 and chamber 14 are swung upwardly to vertical position. The elevation lock member 37 is then actuated to fit the lug 36 between a set of the teeth of the elevation section 35 appropriate for the particular elevation seating desired. The launcher tube 11 and chamber 14 may be trained in azimuth by loosening the bolts 33 and clamping plates 32 and rotating the azimuth ring 20 to the desired azimuth position, whereupon the bolts 33 may be tightened to lock the clamping plates 32 against the edge of the azimuth ring 20.

Upon ignition of the rocket fuel, for example, by a conventional igniter and ignition leads operated from any suitable power source, the exhaust gases accumulate in the pressure modulating chamber 14 and begin to build up pressure on the piston assembly 54. The speed of pressure build up is of course determined by the volume of the pressure modulating chamber 14, and the position of the rocket exhaust nozzle relative to the breech end 13 of the launcher tube 11. For a finite period, rocket thrust is higher than modulating chamber pressure on the launching piston 56. Shearing or separation of the mounting blocks 65 during this period would release the rocket and destroy the additional thrust function of the launcher. However, the mounting blocks 65 cause the launching piston 56 to be carried along with the rocket until the pressure of the accumulated exhaust gases in the modulating chamber 14 produces a thrust against the launching piston 56 which is greater than the reaction thrust of the rocket. When the thrust against the piston 56 exceeds the rocket thrust, the mounting blocks 65 are caused to tip down, projecting the nose 68 into the hole 69 and breaking the brittle pin 70 holding the mounting block 65 on the piston 56. The mounting block 65 continues to hold the rocket 52 in alignment with the launching piston 56 during the travel of the rocket up the launching tube 11 so long as the pressure on the piston exceeds rocket thrust, until the rocket and launching piston 56 exit from the tube 11, whereupon the piston 56 is free to fall away.

Figure 7:
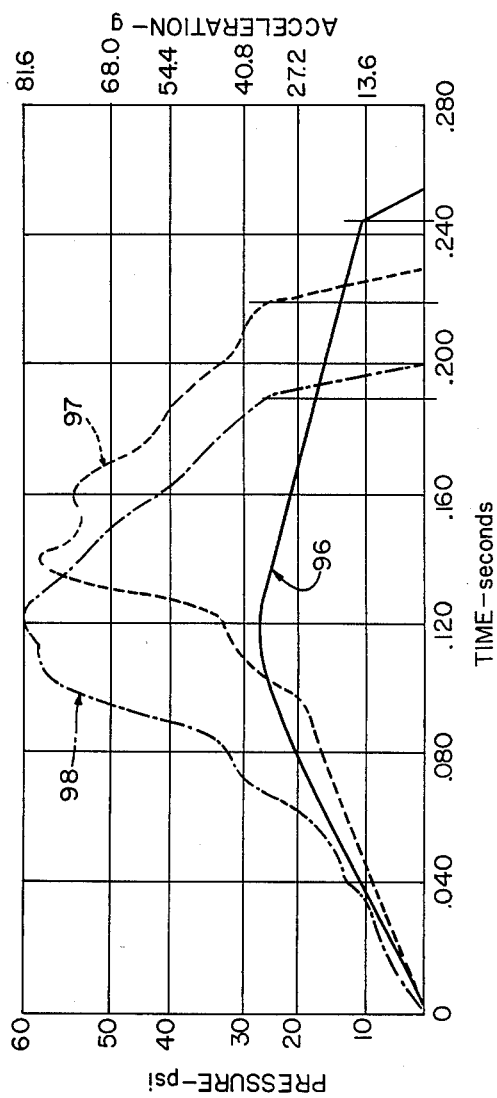
FIGURE 7 is a graph illustrating pressure vs. time relationships for several exemplary rocket launchings.

At some point during the travel of the rocket and launching piston 56 through the tube 11, the auxiliary gas generator unit 76 is actuated, either by achievement of a preselected pressure level in the pressure modulating chamber 14 or by a combination of achievement of a selected pressure level and movement of the launching piston 56 to a position just beyond the sensing end 94 of the hose 93. Thereupon, the pressure on the rear or outer face of the piston 86 in the gas generator unit exceeds the restraining force of the spring plunger 92 and causes the piston 86 to be slammed inwardly, detonating the percussion cap of the gas generator cartridge 80 and admitting additional gas to the pressure modulating chamber 14 through the vent openings 82 to produce further increase in the pressure against the launching piston 56. There are illustrated in FIGURE 7 three pressure time curves for test missiles with a launcher of the construction illustrated and described. Each of these tests were conducted with a 25,000 cubic inch volume pressure modulating chamber 14 and a 15 foot long launching tube 11. In the first test represented by the curve 96, no gas generator was used. This test resulted in a launching velocity of 161 feet per second, and a maximum acceleration of 36.7 G. In the second test, represented by the curve 97, a gas generator actuated upon attainment of a pressure level of 11.5 p.s.i. was used, and an exit velocity of 240 feet per second with a peak acceleration of 79.2 G was achieved. In the third test, depicted by the curve 98, the gas generator was actuated at 5.5 p.s.i. and an exit velocity of 260 feet per second was attained with a peak acceleration of 105 G.

In both the second and third tests, a gas generator unit having a burning time of .080 second and an internal gas generator pressure of 1250 p.s.i. were used. These tests clearly demonstrated that considerable increase in the launching velocity of the rocket was attained sufficient to make possible reliable launchings in surface winds of up to 30 miles per hour.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A launcher for rockets and the like comprising an elongated launcher tube having muzzle and breech ends adapted to support a rocket prior to ignition adjacent the breech end thereof and guide the rocket during acceleration through the tube, means providing increased launching thrust for the rocket including piston means disposed in the launcher tube for free sliding movement therealong substantially sealing the launcher tube against passage of gases forwardly alongside the rocket and intercoupled with the rocket to impart launching movement thereto, expansion chamber means surrounding, extending rearwardly of and communicating with the breech end portion of said launcher tube defining an enclosed gas accumulating space including the space within said launcher tube aft of the piston means for entrapping rocket motor exhaust gases produced upon ignition of the rocket to apply the pressure of the entrapped gases against said piston means and exerting a launching force coacting with reaction thrust of the rocket for driving the rocket out of the launching tube, said piston means having an opening therethrough to provide communication prior to ignition and throughout launch between said gas accumulating space and the trailing end of the rocket, and auxiliary gas generator means communicating with said gas accumulating space including activating means responsive to attainment of a selected pressure level therein for activating said auxiliary gas generator to augment the entrapped rocket exhaust gases in accelerating the rocket through the launcher tube.

2. A launcher for rockets and the like comprising an elongated launcher tube having muzzle and breech ends adapted to support a rocket prior to ignition adjacent the breech end thereof and guide the rocket during acceleration through the tube, means providing increased launching thrust for the rocket including piston means disposed in the launcher tube for free sliding movement therealong substantially sealing the launcher tube against passage of gases forwardly alongside the rocket and intercoupled with the rocket to impart launching movement thereto, and expansion chamber means surrounding, extending rearwardly of and communicating with the breech end portion of said launcher tube forming an enclosure for accumulating the exhaust gases produced upon ignition of the rocket to apply the pressure of the accumulated gases against said piston means and exert a launching force coacting with reaction thrust produced upon ignition of the rocket for driving the rocket out of the launching tube, said piston means having an opening therethrough to provide communication prior to ignition and throughout launch between said expansion chamber means and the trailing end of the rocket, said expansion chamber means providing a gas accumulating volume of sufficient size so that a substantially even application of exhaust gas pressure against said piston means is provided, and means including a source of additional gas pressure communicating with the space within said expansion chamber means and means responsive to selected pressure conditions of the accumulated exhaust gases subsequent to ignition of the rocket for actuating said source to introduce additional gas pressure into the gas accumulating space and increase the launching forces exerted by the pressure of the accumulated gases against said piston means.

3. A launcher for rocket propelled devices comprising an elongated launcher tube having breech and muzzle ends, a closed expansion chamber surrounding, extending rearwardly of and disposed in concentric relation to the breech end and adjacent zone of the launcher tube, means adjacent the rocket device forming a gas pressure barrier across the launcher tube defining with said closed expansion chamber an enclosed space for accumulation of exhaust gases produced upon ignition of the rocket device, said gas pressure barrier having an opening therethrough to provide communication prior to ignition and throughout launch between said enclosed space and the trailing end of the rocket device, said gas pressure barrier being freely displaceable through said launcher tube in response to gas pressure in said enclosed space and having means forcing said rocket device therewith, said enclosed space having an initial volume when said rocket device and gas pressure barrier occupy a launch position adjacent the breech end of said tube of sufficient size relative to the volume of the launcher tube so that the pressure of the accumulated exhaust gases is free of substantial negative going excursions during travel of the rocket through the launching tube producing substantially impulse-free acceleration of the rocket device through the launcher tube, and auxiliary gas generator means communicating with said enclosed space including activating means responsive to attainment of a selected pressure level in said enclosed space for activating said auxiliary gas generator to introduce additional gases into said enclosed space to increase the pressure therein and augment the entrapped exhaust gases in accelerating the rocket through the launcher tube.

4. A launcher for rocket propelled devices comprising an elongated launcher tube having breech and muzzle ends, a closed expansion chamber surrounding, extending rearwardly of and disposed in concentric relation to the breech end and adjacent zone of the launcher tube, piston means, disposed in the launcher tube and having an opening therethrough adapted to be intercoupled with the rocket device, forming a gas pressure barrier across the launcher tube defining with said closed expansion chamber an enclosed space for accumulation of exhaust gases produced upon ignition of the rocket device, said piston means being free of restraint by said launching tube and displaceable through said launcher tube in response to gas pressure in said enclosed space and having means forcing said rocket device therewith, said enclosed space having a large volume when said rocket device and piston means occupy a launch position adjacent the breech end of said tube of sufficient size such that the increase of volume due to displacement of the rocket device and piston means up the launcher tube during launching is small relative to the initial enclosed volume prior to launching to cause gas pressure to be exerted against said piston means producing substantially impulse free acceleration of the rocket device through the launching tube, and auxiliary gas generator means disposed in communication with said enclosed space to introduce additional gases therein upon activation of the gas generator means and including sensor means disposed in said launcher tube to be exposed to gas pressure in said enclosed space when said piston means has traveled a preselected distance up the launcher tube and responsive to a selected gas pressure level for activating said auxiliary gas generator means upon movement of the piston means the selected distance and attainment of the selected gas pressure level in said enclosed space to augment the entrapped exhaust gases in exerting launching pressure on said piston means and accelerating the rocket through the launcher tube.

5. A launcher as claimed in claim 1 wherein said activating means comprises an actuator and means for restraining said actuator until said selected pressure level is attained.

6. A launcher as claimed in claim 3 wherein said activating means comprises an actuator and means for restraining said actuator until said selected pressure level is attained.

7. A launcher for rockets of the type having a rocket motor nozzle at the trailing end thereof terminating in an outwardly flaring annular lip, said launcher comprising an elongated launcher tube having open breech and muzzle ends, a cup-shaped piston opening toward the breech end of said launcher tube adapted to be disposed between said breech end and the outwardly flaring lip of said nozzle, said piston including an annular disk-like wall disposed transversely of the axis of the launcher tube having an outer diameter conforming substantially to the inner diameter of the launcher tube and an inner diameter conforming substantially to the inner diameter of the exit end of said nozzle and an annular cylindrical flange wall projecting from said annular disk-like wall toward said breech end in free sliding relation with said launcher tube, releasable coupling means intercoupling said annular disk-like wall of said piston with said outwardly flaring rim of said nozzle for applying launching force to the rocket in accordance with movement of the piston axially through the launch tube, a closed expansion chamber surrounding, disposed in concentric relation to and in communication with the breech end and adjacent zone of the launcher tube and further in communication prior to ignition and throughout launch with said rocket motor nozzle providing an initial volume when said piston and rocket occupy a launch position adjacent the breech end of the launcher tube of sufficient size relative to the increase of volume due to travel of the piston up the launcher tube during launching to provide substantially even exhaust gas pressure against said piston upon ignition of the rocket maintaining substantially impulse free acceleration of the rocket as it proceeds through the launcher tube, and auxiliary gas generator means communicating with said expansion chamber including activating means responsive to attainment of a selected pressure level in said expansion chamber for activating said auxiliary gas generator to introduce additional gases into said expansion chamber to increase the pressure therein and augment the entrapped exhaust gases in accelerating the rocket through the launcher tube.

References Cited in the file of this patent

UNITED STATES PATENTS

| | | |
|---|---|---|
| 2,360,217 | Francis | Oct. 10, 1944 |
| 2,644,364 | Nass | July 7, 1953 |
| 2,657,630 | Blacker | Nov. 3, 1953 |
| 2,788,744 | Donner | Apr. 16, 1957 |
| 2,801,416 | Evans et al. | Aug. 6, 1957 |
| 3,011,406 | Werle et al. | Dec. 5, 1961 |

FOREIGN PATENTS

| | | |
|---|---|---|
| 502,560 | France | Feb. 24, 1920 |